United States Patent [19]

Ban et al.

[11] 4,456,636

[45] Jun. 26, 1984

[54] METHOD OF APPLYING HIGH-DENSITY INFORMATION RECORD LUBRICANTS

[75] Inventors: Vladimir S. Ban, Princeton Township, Mercer County; Eugene S. Poliniak, Willingboro Township, Burlington County, both of N.J.

[73] Assignee: RCA Corporation, New York, N.Y.

[21] Appl. No.: 527,806

[22] Filed: Aug. 30, 1983

[51] Int. Cl.³ ............................................. B05D 3/12
[52] U.S. Cl. .................................. 427/240; 252/49.6; 427/407.1
[58] Field of Search ............ 427/240, 387, 393.5, 427/407.1, 409, 421; 252/49.6; 428/65, 447, 900; 369/274, 283, 286, 288; 346/135.1, 137; 358/344

[56] References Cited

U.S. PATENT DOCUMENTS

| 4,275,101 | 6/1981 | Wang et al. | 369/286 |
|---|---|---|---|
| 4,327,140 | 4/1982 | Preston | 428/65 |
| 4,330,583 | 5/1982 | Datta et al. | 428/65 |
| 4,336,309 | 6/1982 | Jäckel et al. | 428/447 |
| 4,340,629 | 7/1982 | Hillenbrand et al. | 428/64 |
| 4,342,660 | 8/1982 | Berry et al. | 252/49.6 |
| 4,346,468 | 8/1982 | Preston et al. | 369/276 |
| 4,346,469 | 8/1982 | Hillenbrand et al. | 369/276 |
| 4,351,048 | 9/1982 | Berry | 369/288 |
| 4,355,062 | 10/1982 | Wang et al. | 428/64 |
| 4,371,585 | 2/1983 | Memon | 428/412 |
| 4,378,389 | 3/1983 | Maruyama et al. | 427/387 |
| 4,382,006 | 5/1983 | Horodysky | 252/49.6 |
| 4,383,961 | 5/1983 | Nyman et al. | 264/107 |
| 4,389,441 | 6/1983 | Datta et al. | 428/65 |

*Primary Examiner*—Thurman K. Page
*Attorney, Agent, or Firm*—Birgit E. Morris

[57] ABSTRACT

Methyl alkyl siloxane lubricants and dopants for capacitance electronic discs are applied to the discs from a butanol solution.

6 Claims, No Drawings

METHOD OF APPLYING HIGH-DENSITY INFORMATION RECORD LUBRICANTS

This invention relates to an improved method of applying a lubricant coating to high-density information records.

BACKGROUND OF THE INVENTION

Commercially available high-density information records such as capacitance electronic discs contain a lubricant coating on their surface to reduce stylus wear. The lubricant presently employed is a purified methyl alkyl siloxane having the formula

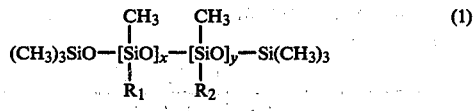

wherein $R_1$ and $R_2$ are alkyl groups of 4–20 carbon atoms, x is an integer of 2–4, y is an integer of 0–2 and wherein the sum of x and y is 4 or less. Presently preferred is that fraction boiling between 100° and 205° C. Since the surface of such discs is sensitive to moisture, a dopant is added to the lubricant to reduce the sensitivity. Although the mechanism for the improvement is not known, it is believed the dopant provides boundary lubrication at the surface of the disc which prevents moisture from leaching out impurities and incompatible components from the disc surface. When moisture is evaporated from the surface of a disc which does not contain such dopants, salt deposits form on the surface that interfere with playback. This phenomenon is known as "carrier distress".

The lubricant and dopants are presently applied to high-density information discs from a heptane solution. The use of heptane as a solvent has several major disadvantages: heptane is highly inflammable so elaborate precautions must be used in commercial operation to prevent fire and explosion; the costs of the pure heptane are high; and heptane does not dissolve all of the known effective dopants; thus the heptane insoluble dopants must be applied either from separate solutions or another solvent must be added to the heptane, further complicating the process and adding to its cost.

SUMMARY OF THE INVENTION

We have found that butanol-1 or butanol-2 are excellent solvents for both the methyl alkyl siloxane lubricant and various classes of known dopants employed in high-density information disc manufacture. Further we have found that the butanols are equivalent to n-heptane both in ease of application and effectiveness of the lubricant spreading on the disc surface.

DETAILED DESCRIPTION OF THE INVENTION

Butanol-1 and butanol-2 are excellent solvents for various classes of known high-density information disc lubricant dopants and they also dissolve the methyl alkyl siloxane lubricant as well. Since the butanols are excellent water displacers, the discs can be dipped into a butanol solution which will both dry the discs and apply one or more dopants or a doped lubricant solution to the surface of the disc. The dopants and/or lubricant remain on the disc surface after evaporation of the butanol solvents. The dopants and doped lubricants can also be applied to the disc by spraying onto the surface or by spin-coating. In any case a uniform film of the materials applied to the surface is obtained and the butanols are in all respects equivalent to n-heptane but without n-heptane's disadvantages discussed hereinabove.

Know dopants include various types of amines or quaternary ammonium salts or silicone compounds. For example Datta et al have disclosed the addition of hydroxylated amines, see U.S. Pat. No. 4,330,583; Wang et al have disclosed hydroxylated methyl alkyl disiloxanes, see U.S. Pat. No. 4,355,062; and Shidlovsky et al have disclosed adding certain betaines, see co-pending application Ser. No. 344,535. Other dopants are also known, and are meant to be included herein to the extent that they are soluble in butanol-1 or butanol-2. A combination of dopants can also be employed, see for example U.S. Pat. No. 4,389,441 of Datta et al. The above patents are herein incorporated by reference. The dopant additives can be dissolved in the butanol-1 or butanol-2 and applied to the surface of the records separately from the lubricant or, preferably, the lubricant and dopant are mixed together in solution in butanol and applied together either by spraying or spin-coating. The exact concentration of the lubricant in the butaol solution is not critical and in general can vary from about 0.01% to 1.0% by weight. The amount of dopant added to the lubricant must be at least that amount required to effect an improvement in moisture-sensitivity of the disc but again is not critical. In general dopant amounts of from about 1% to 40% by weight of the additive based on the weight of the lubricant is effective, although higher amounts of dopant can be employed if desired.

The lubricant system of the present invention can be applied to high-density information records as they are pressed from the mold, which is preferable, or the records can be cleaned first with an aqueous wash solution. The cleaning solution presently preferred is a 5% aqueous solution of a mixture containing 96.2 mol percent of an alcohol having the formula

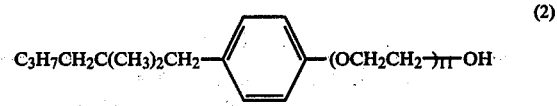

about 3.8 mol percent of 1,2-propane diol and a minor amount of triisopropanol amine. The cleaned records may be dried with a solvent such as 1,1,2-trifluoro-2,2,1-trichloroethane, see U.S. Pat. No. 4,383,961.

The invention will be further illustrated by the following examples, but the invention is not meant to be limited to the details therein. In the examples parts and percentages are by weight unless otherwise noted.

Carrier distress time is measured by adding the amount of time in seconds (but discounting intervals of less than 10 microseconds) during record playback when the r.f. output of the player arm is less than 150 millivolts peak to peak and the time when the r.f. output gives above 8.6 Megahertz or below 3.1 Megahertz in frequency, indicating a defect. Such defects are noted by the viewer as dropouts. The present acceptable level of carrier distress for a capacitance electronic disc is three seconds in one hour of playback time.

EXAMPLE 1

Two capacitance electronic discs as pressed were dipped vertically in a solution made from butanol-1 containing 0.03% of a fractionated methyl decyl siloxane lubricant made by the process described by Wang et al in U.S. Pat. No. 4,275,101. One disc was withdrawn from the solution immediately (A) and the other was left to soak for two minutes (B).

Samples were punched from the top (the area last in, first out of the bath), top center, bottom center, and bottom of the disc and measured for thickness of the coating by X-ray fluorescence.

Sample A had a thickness variation of the coating of from 244 to 348 Å. Sample B varied from 291 to 354 Å in thickness. Thus acceptable thickness and similar variations were obtained by either method.

EXAMPLE 2

Twelve capacitance electronic discs were subjected to the standard commercial lubrication process, i.e., after pressing the discs were washed as described above, rinsed with water and dried in 1,1,2-trifluoro-2,2,1-trichloroethane. A solution containing 0.03% of methyl decyl siloxane and 15% based on the weight of the siloxane of 1,3-bis(4-hydroxybutyl)-1,3-dimethyl-dodecyldisiloxane having the formula

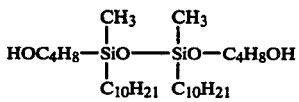

(3)

(see U.S. Pat. No. 4,355,062) in n-heptane was sprayed onto the discs. These were the control discs.

Another set of washed and dried discs was sprayed with a butanol-1 solution containing the siloxane and dopant in the same concentration.

The discs were played once, exposed in a chamber at 100° F. and 95% RH for one hour and played again. Carrier distress was measured. The stress test was then repeated. The data are summarized below in TABLE I.

TABLE I

| | CARRIER DISTRESS, secs. | |
|---|---|---|
| | Control | Example 2 |
| Initial Play | | |
| Median | 0.2 | 0.1 |
| Range | 0.1–0.9 | 0.1–0.3 |
| # Passed | 12/12 | 12/12 |
| After 1st Stress | | |
| Median | 0.2 | 0.1 |
| Range | 0.1–0.5 | 0.1–0.5 |
| # Passed | 12/12 | 12/12 |
| After 2nd Stress | | |
| Median | 0.2 | 0.1 |
| Range | 0.1–0.4 | 0.1–0.4 |
| # Passed | 12/12 | 12/12 |

The above data show that butanol-1 solvent is equivalent in every way to n-heptane solvent.

EXAMPLE 3

A solution was made of 0.5% of methyl decyl siloxane as in Example 1 in butanol-2. Fifteen percent of the siloxane of the dopant of Example 2 was added to one portion and 10% of the siloxane of a hydroxylated amine dopant sold as Catanac 609 of Amercian Cyanamid Company and having the formula

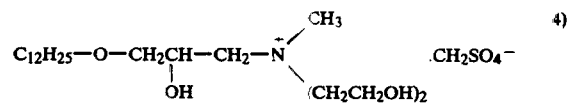

(4)

was added to another portion. All three solutions were clear. The solutions were sprayed onto capacitance electronic discs, some as pressed and others washed and dried as in Example 2. In all cases oil thickness was about 250 Å and uniformity over the surface of the disc was satisfactory.

Playback results are summarized below in TABLE II.

TABLE II

| | CARRIER DISTRESS, secs. | | |
|---|---|---|---|
| | Median | Range | # Passed |
| Samples as Pressed | | | |
| 1. Siloxane Only | 51.2 | 16.1–118 | 3/12 |
| 2. Siloxane + Dopant A* | 3.71 | 1.3–79.7 | 5/12 |
| 3. Siloxane + Dopant B** | 2.57 | 1.9–7.3 | 7/12 |
| 4. Siloxane + Dopants A + B | 0.26 | 0.08–10.5 | 10/12 |
| Samples Washed and Dried | | | |
| 5. Siloxane Only | 5.3 | 0.8–21.9 | 4/12 |
| 6. Siloxane + Dopant A | .9 | 0.7–4.9 | 10/12 |
| 7. Siloxane + Dopant B | 1.6 | 1.1–8.2 | 5/12 |
| 8. Siloxane + Dopants A + B | 0.2 | 0.08–0.48 | 12/12 |

*See dopant Example 2.
**See dopant Example 3.

EXAMPLE 4

A series of discs was tested to compare a coating applied according to the process of the invention and standard applied coatings. The control coating was made by spraying 0.03% of methyl decyl siloxane and 0.003% of the amine dopant of Example 3 in a mixed solution of n-heptane containing 10% of isopropylalcohol onto washed and dried discs.

A solution was also made of methyl decyl siloxane and 10% of the solution of the hydroxylated amine dopant of Example 3 and 10% of the siloxane of the hydroxybutyldisiloxane dopant of Example 2 in butanol-2. The solutions were spin-coated onto as-pressed and onto washed and dried discs. The discs were played once and stressed as in Example 2. Results are summarized below in TABLE III.

TABLE III

| | CARRIER DISTRESS, secs. | |
|---|---|---|
| Sample | Median | Range |
| 1. Control | 1.46 | 1–39.1 |
| 2. Washed & Dried | 0.2 | 0.08–0.48 |
| 3. As Pressed | 0.26 | 0.08–10.5 |

EXAMPLE 5

This example shows variation of carrier distress with varying amounts of dopant added to methyl decyl siloxane lubricant. A solution was made containing 0.03% of methyl decyl siloxane, 0.1%, 1.0% and 5.0% respectively of the hydroxylated amine of Example 3 based on the weight of the siloxane, dissolved in butanol-1. As pressed capacitance electronic discs were sprayed with these solutions, the discs were played once, stressed twice as in Example 2, and carrier distress measured.

The results are given below in TABLE IV. The control was 0.03% of methyl decyl siloxane in butanol without any dopant.

TABLE IV

| | CARRIER DISTRESS, secs. | | | | | | | | |
|---|---|---|---|---|---|---|---|---|---|
| | Initial Play | | | After 1st Stress | | | After 2nd Stress | | |
| Samples | Median | Range | # Passed | Median | Range | # Passed | Median | Range | # Passed |
| Control | 0.1 | 0–0.1 | 6/6 | 376 | 177–822 | 0/6 | 124 | 44–215 | 0/6 |
| 0.01% Dopant | 0.3 | 0–94 | 4/6 | 76 | 15–18 | 0/6 | 0.4 | 0.2–3.1 | 5/6 |
| 0.10% Dopant | 0.1 | 0–0.2 | 6/6 | 0.2 | 0.1–0.7 | 6/6 | 0.2 | 0.1–3.8 | 5/6 |
| 1.0% Dopant | 0.2 | 0–0.2 | 6/6 | 3.4 | 0.4–11.0 | 2/6 | 1.3 | 0.1–145 | 4/6 |

Optimal results appear to be had at about 0.1% of dopant with respect to lubricant.

We claim:

1. In the method for lubricating a capacitance electronic disc comprising applying a layer of methyl alkyl siloxane containing a dopant to the surface thereof, the improvement which comprises dissolving the lubricant and dopant in a butanol solution and applying to the disc surface.

2. A method according to claim 1 wherein the solution is applied by spraying onto the disc.

3. A method according to claim 1 wherein the solution is applied by dipping the disc first in a butanol solution containing the dopant and then into a second solution containing the methyl alkyl siloxane.

4. A method according to claim 1 wherein the solution is applied by spin-coating onto the surface of the disc.

5. A method according to claim 1 wherein the lubricant is methyl decyl siloxane boiling at between 100° and 205° C.

6. A method according to claim 1 wherein the dopant contains one or more members of the group consisting of

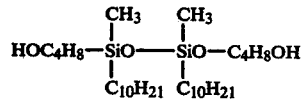

and

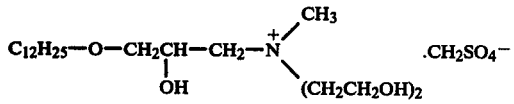

* * * * *